Jan. 19, 1971   H. C. CHAPMAN   3,555,793
GUARD FOR ROTARY LAWNMOWERS
Filed Dec. 4, 1968
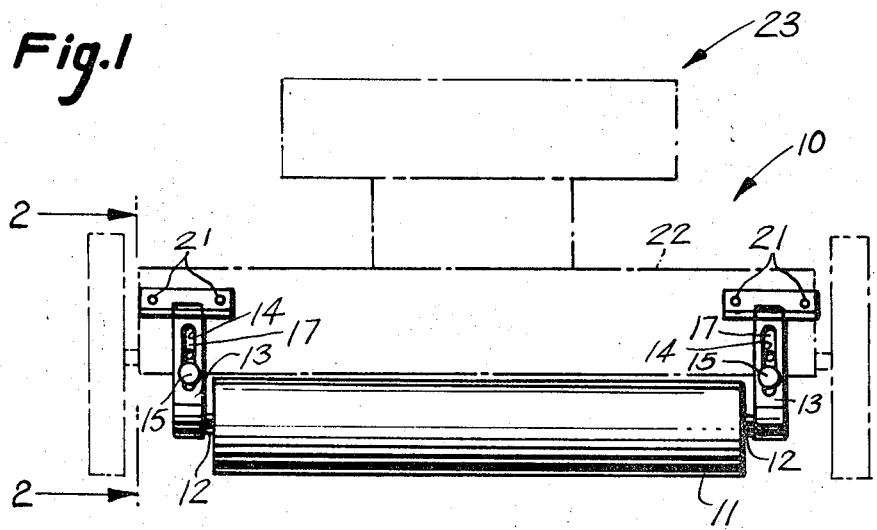
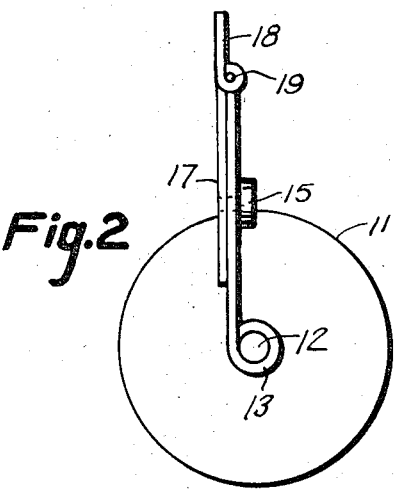
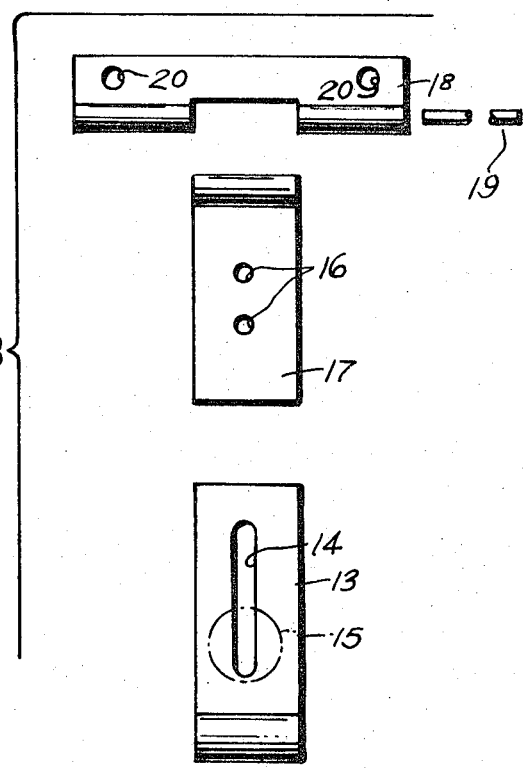
INVENTOR.
*Howard C. Chapman*

United States Patent Office 3,555,793
Patented Jan. 19, 1971

3,555,793
GUARD FOR ROTARY LAWNMOWERS
Howard C. Chapman, 623 E. 3rd St.,
Hastings, Minn. 55033
Filed Dec. 4, 1968, Ser. No. 780,986
Int. Cl. A01d 73/00
U.S. Cl. 56—25.4    1 Claim

ABSTRACT OF THE DISCLOSURE

A roller and an adjustable mount for securement to the rear of a lawnmower. This device serves to protect the operator from flying objects that may be thrown rearward from the lawnmower.

---

This invention relates to protective attachments for lawnmowers, and more particularly to a guard for rotary lawnmowers.

It is therefore the main purpose of this invention to provide a guard for rotary lawnmowers which will be hingeably secured to the rear of the lawnmower in order to protect the operator from flying objects that may be thrown away from the mower.

Another object of this invention is to provide a guard for rotary lawnmowers which will consist of an elongated roller which is suspended within carry-like members that are adjustable and hinged to the rear of the mower.

A further object of this invention is to provide a guard for rotary lawnmowers which will have a roller serving as a guard means against foreign objects while the roller remains free of grass to be threaded in rolling engagement with the ground.

Other objects of this invention are to provide a guard for rotary lawnmowers which is simple in design, inexpensive to manufacture, rugged in construction, easy to use and efficient in operation.

These and other objects will become readily apparent upon a study of the following specification together with the accompanying drawing wherein:

FIG. 1 is a front view of the present invention showing the lawnmower in phantom lines;

FIG. 2 is an enlarged view taken along the lines 2—2 of FIG. 1; and

FIG. 3 is an exploded plan view of one of the roller support members.

According to this invention, a guard 10 for rotary lawnmowers includes an elongated roller 11 having extending shafts 12 which are rotatably carried within carrying plates 13. Bearing plates 13 are provided with an elongated slot 14 in which a set screw 15 is slideable. Set screw 15 is threaded into either of the spaced apart openings 16 of hinge plates 17. Hinge plates 17 are received within horizontal hinge plates 18 and are held in position by means of elongated pins 19. The hinge plates 18 are provided with couplings 20 which receive screw fasteners 21 which secure the spaced apart hinge plates 18 to the skirt 22 of lawnmower 23.

In use, roller 11 rotates as the lawnmower moves along the ground and thereby revolves a protective barrier again which stones, glass and other objects will strike instead of travelling rearward and hitting the operator of the lawnmower 23.

It will be noted that when the roller 11 strikes a ground object the hinge plate 17 will pivot upon the hinge pin 19 allowing the roller 11 to travel over the object without interfering with the operation of the lawnmower.

It shall further be noted that the set screws 15 in combination with the slots 14 provide a means of adjusting the height of roller 11 in order to properly position lawnmower 23.

It shall also be recognized that roller 11 can be made of any suitable soft material which will keep sharp objects from ricocheting off of the roller 11.

The hinge plate 17 and the bearing plate 13 may also be made in such a manner so as to eliminate the slot 14.

What I now claim is:

1. A guard for rotary lawnmowers, comprising in combination, a shaft and a roller, said roller being supported rotatably free upon said shaft, the oposite ends of said shaft extending outwardly of opposite ends of said roller, each said opposite ends of said shaft being supported rotatably free within a bearing formed at one end of a slideably adjustable extension plate, said extension plate having an elongated slot therethrough, said slideably adjustable extension plate being adjustably securable to a pivotable hinge plate, said hinge plate including a bearing at one end thereof, said bearing of said pivotable hinge plate receiving a hinge pin, said hinge pin being receivable and supported at its opposite ends within a pair of bearings in spaced apart relation formed upon a fixed hinge plate, said fixed hinge plate and said pivotable hinge plate together comprising a hinge, a pair of said hinges accordingly being secured to opposite ends of a rotary lawnmower, and said pivotable hinge plate having a pair of threaded openings therethrough for receiving a screw fitted through said slot of said slideably adjustable extension plate for selective slideable adjustment thereof.

References Cited

UNITED STATES PATENTS

| | | | |
|---|---|---|---|
| 3,106,812 | 10/1963 | McDonagh | 56—25.4 |
| 3,190,061 | 6/1965 | Gilbertson | 56—25.4 |
| 3,391,524 | 7/1968 | Nickoloff et al. | 56—25.4 |

ANTONIO F. GUIDA, Primary Examiner